Figure 12:
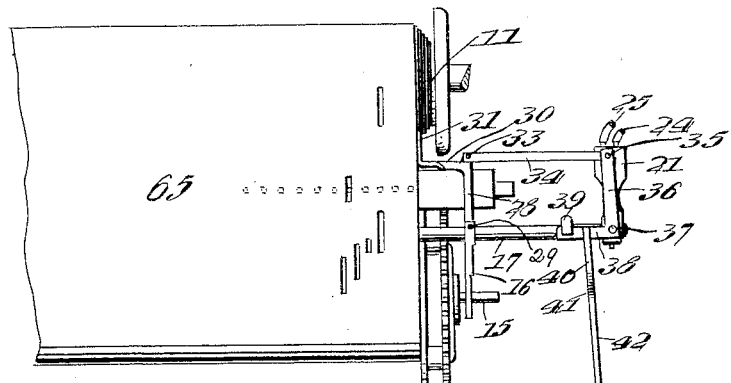

G. P. BRAND.
TRACKING DEVICE.
APPLICATION FILED MAR. 12, 1910.
1,040,869.
Patented Oct. 8, 1912.
4 SHEETS—SHEET 1.
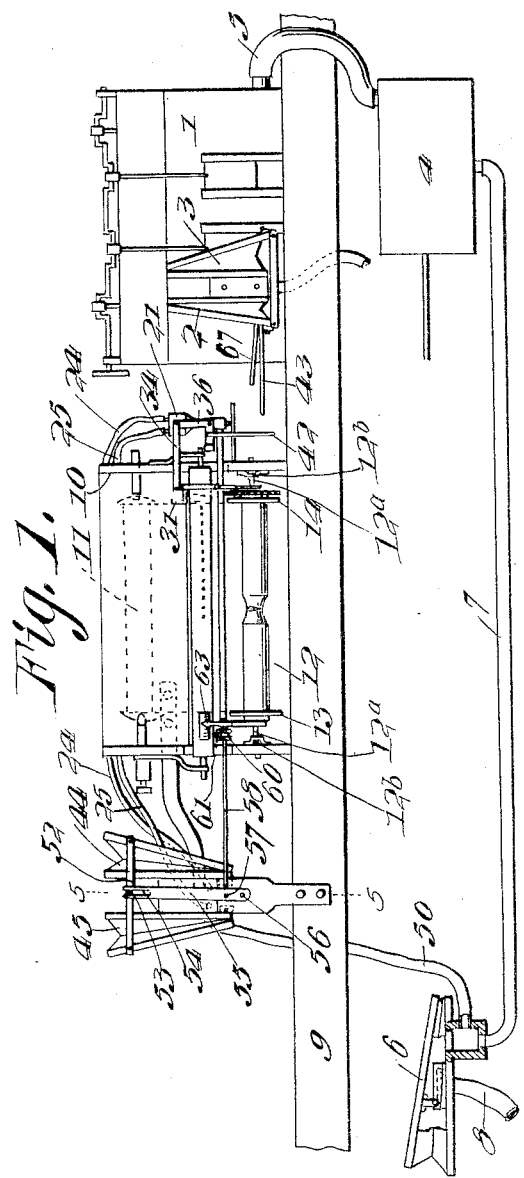
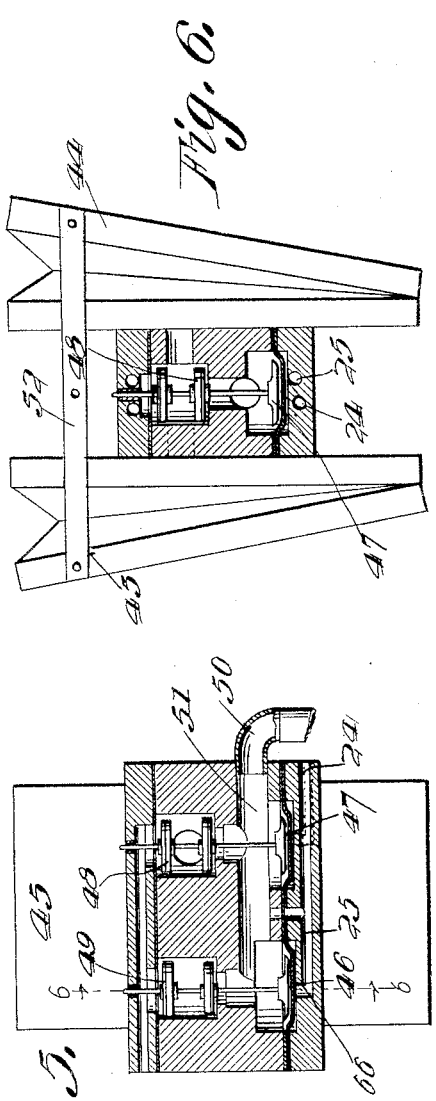
Witnesses
Samuel Scrivener
John Scrivener
Inventor
George P. Brand
By E. H. Bond
Attorney

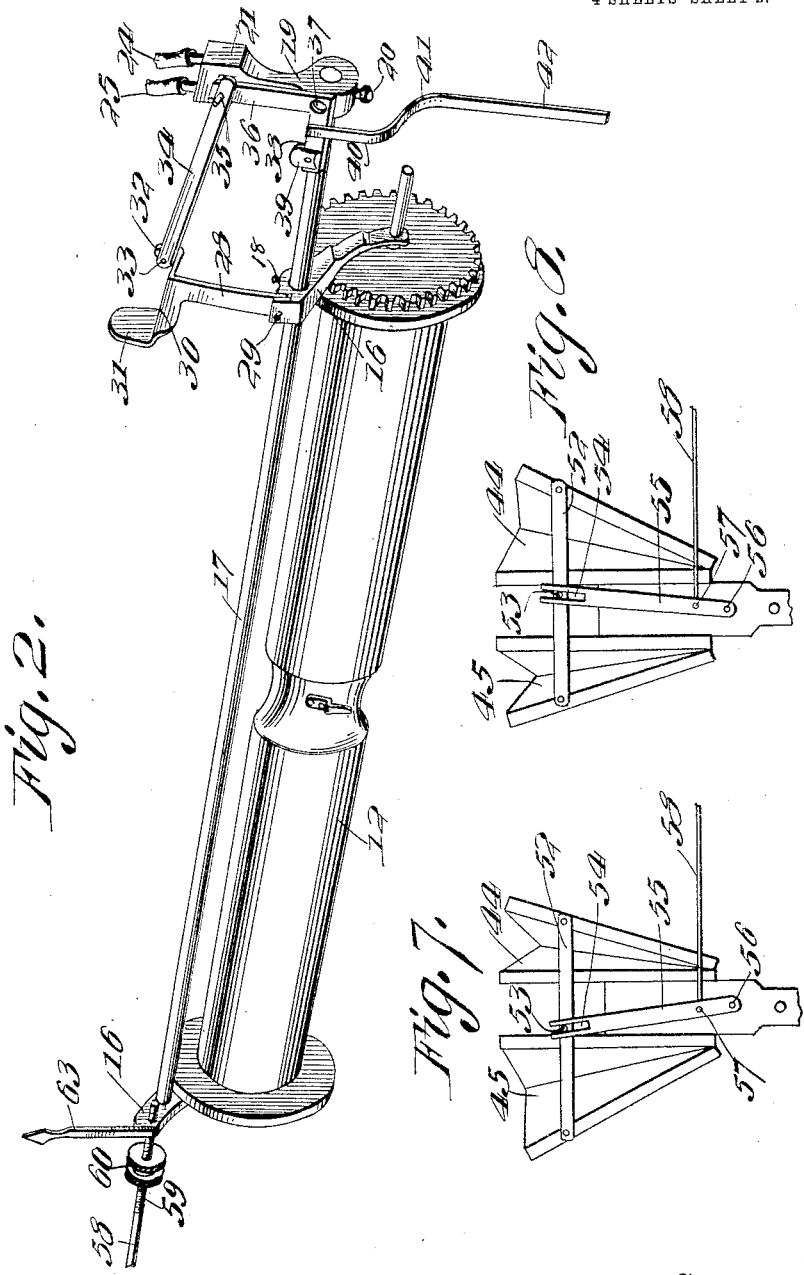

G. P. BRAND.
TRACKING DEVICE.
APPLICATION FILED MAR. 12, 1910.
1,040,869.
Patented Oct. 8, 1912.
4 SHEETS—SHEET 3.
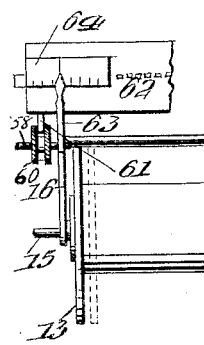
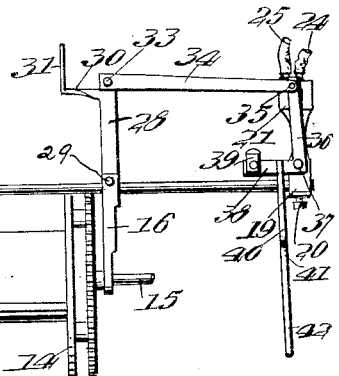
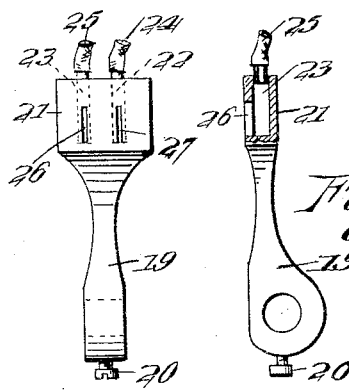
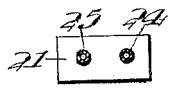
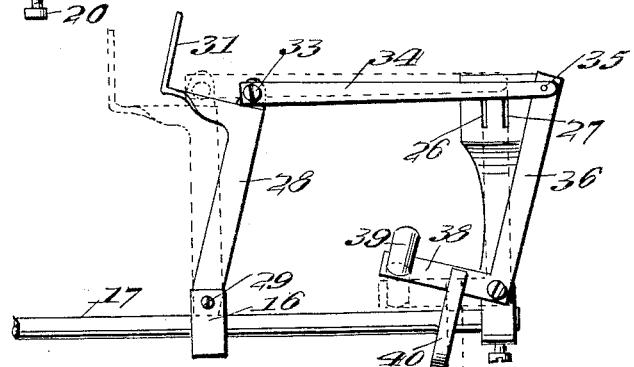
Witnesses
Samuel Scrivner
John Scrivner
Inventor
George P. Brand
By E. H. Bond
Attorney
COLUMBIA PLANOGRAPH CO., WASHINGTON, D. C.

G. P. BRAND.
TRACKING DEVICE.
APPLICATION FILED MAR. 12, 1910.

1,040,869.

Patented Oct. 8, 1912.

4 SHEETS—SHEET 4.

UNITED STATES PATENT OFFICE.

GEORGE P. BRAND, OF NEW YORK, N. Y.

TRACKING DEVICE.

1,040,869. Specification of Letters Patent. Patented Oct. 8, 1912.

Application filed March 12, 1910. Serial No. 548,986.

*To all whom it may concern:*

Be it known that I, GEORGE P. BRAND, a citizen of the United States of America, and resident of New York, in the county of New York and State of New York, have invented certain new and useful Improvements in Tracking Devices, of which the following is a specification.

This invention relates to certain new and useful improvements in means for assuring alinement of the perforations in a music sheet and the ducts of a tracker bar.

It is a well-known fact that in the operation of piano players and similar devices much trouble is experienced on account of the music sheet not passing over the tracker bar properly, that is so that the perforations in the music sheet will properly aline with their respective ducts in the tracker bar. This is occasioned from various causes:—the shrinkage and swelling of the paper, the uneven winding of the sheet on the spools, unevenness in width at the opposite edges of the sheet, and numerous other causes which are well-known to those familiar with the art. Various means have heretofore been devised for overcoming this objection. I am aware that it has been proposed to meet this requirement by means of guides engageable with one or both edges of the music sheet. It has also been proposed to obviate this objection by means for automatically shifting the rollers or spools in the direction of their length. Again it has been proposed to move the tracker bar automatically in order to bring about the proper alinement. In such devices, however, it has been the practice to shift the sheet with relation to the tracker bar or the tracker bar transversely with relation to the direction of movement of the sheet. So far as I am aware, however, I am the first to provide means whereby the desired result is accomplished by maintaining the once-adjusted relative positions of the music sheet and tracker bar. That is, I do not move my tracker bar with relation to the sheet nor the sheet with relation to the tracker bar. When once adjusted with relation to each other, the movement is such as to always maintain such relative position. By this means I obtain many advantages which will be hereinafter specifically set forth.

While in the present instance the invention will be described as herein illustrated as used in connection with a piano player, it is evident that in many of its respects it is in no wise applicable alone to such devices, but will be found equally as serviceable in other arts, such, for instance, as paper perforating machines, weaving machines and other devices of such a nature as to employ a perforated sheet. In its employment in a mechanical musical instrument, it serves to automatically keep the holes in the sheet and the ducts in the tracker bar in alinement and insures the paper and the tracker always moving in parallelism. This insurance of parallelism is materially brought about by the disposition of the edge guide between the feed roll and the tracker bar, and the lateral movement of the take-up roll with the tracker bar. I employ an edge guide working from the fixed side of the sheet so that shrinking or swelling of the sheet is not allowed to affect the operation of the mechanism, or, in other words, the mechanism is so constructed as to automatically compensate for any tendency to produce injurious effects by such shrinking or swelling. The take-up roll is laterally movable to follow the paper and this take-up roll serves as a carriage with which the tracker bar is movable. The tracker bar is adjustable upon the carriage in addition to being movable therewith in order to bring about proper alinement between the ducts of the tracker and the perforations of the music sheet when the music is primarily placed in the machine. Provision is made also for adjustment of the carriage in relation to the pneumatics which control the movement of the tracker. The edge guide is made most sensitive and this edge guide actuates a controlling member, in this instance a valve which controls ports which, in turn, control the movements of the tracker. The edge guide always follows the movement of the sheet and through the movement of such edge guide the movement of the tracker is controlled so that the two move in unison under all conditions. The carriage adjusting means serves also for the purpose of transposing when desired. The pneumatics which actuate the carriage and tracker are operated under low tension. The edge guide follows the sheet in its movements in both directions and is always in contact therewith. The movement of the take-up roll compensates for unevenness of the sheet on the music roll and thus saves the edge of the paper from running on the flanges of the take-up roll when the music is wound zig-zag on the music roll, thereby making the re-wind more perfect as it is taken up perfectly on the take-up roll, and, consequently, it re-winds back on the other spool more perfectly and avoids the music from running side to side when it is being rewound and thereby saves the edges from being turned over on the flanges of the music spool. By my invention it is not necessary that the flanges of the music spool always contact with the edges of the paper. It would be much better to have a space between both edges of the music and the flanges as there would not be any noise made by the paper rubbing against the flanges when the machine is in operation.

My edge guide automatically adjusts itself to different makes of music, different makes of music rolls and, in fact, to any and all conditions, vary as they may, under which the device may be called upon to operate; one of these is the variation between the right end of the music spool where it bears against the slotted flange and the inner face of the flange adjacent the edge of the music sheet as there is a great variation in the different makes of music at this point. It will be readily seen that the take-up roll naturally follows the music as far to the right as the edge of the music will travel.

I dispense with the employment of springs, pivotally mounting the edge guide and counterbalancing the same and making provision for ease of movement of the valve without liability of sticking by employment of throttle pressure.

The tracker bar and carriage are automatically controlled by two pneumatics, one for moving in one way and the other for moving in the other way. On the re-wind the edge guide is thrown out of the path of the edge of the sheet, so as to avoid contact therewith and also to move the valve so as to expose both of the openings controlled thereby, which throws both pneumatics into their central position and this serves to lock the tracker bar and carriage or lower roll during the re-wind.

Other objects and advantages of the invention will hereinafter appear and the novel features thereof will be particularly pointed out by the appended claims.

The invention is clearly illustrated in the accompanying drawings, which, with the numerals of reference marked thereon, form a part of this specification, and in which I have shown one practical embodiment of the invention, but it is to be understood that the same is capable of embodiment in other forms, and is subject to changes, variations and modifications in details, proportions of parts, etc., without departing from the spirit of the invention or sacrificing any of its advantages. I, therefore, do not wish to restrict myself to the particular construction hereinafter described, as it is evident that various instrumentalities employed may be modified and various other changes made and I, therefore, reserve the right to avail myself of such modifications as come properly within the scope of the protection prayed.

Figure 13:
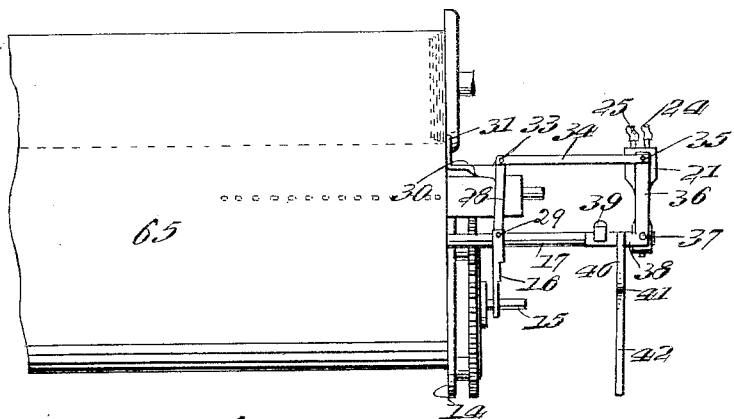

In the accompanying drawings, Figure 1 is an elevation of sufficient of the mechanism of a piano player to illustrate the construction and application of my present improvements. Fig. 2 is an enlarged perspective view of the take-up roll, the edge guide and the valve actuated thereby, the tracker bar and other parts being removed for the sake of clearness. Fig. 3 is an elevation of the parts seen in Fig. 2 with a portion of the tracker bar shown in position. Fig. 4 is an enlarged detail showing the edge guide and connected parts in the position they assume during re-winding. Fig. 5 is a vertical section on the line 5—5 of Fig. 1. Fig. 6 is a section on line 6—6 of Fig. 5. Fig. 7 is a detail showing the tracker-operating pneumatics in the position they assume when the tracker is moved in one direction. Fig. 8 is a similar view showing the position of the pneumatics when the tracker has been moved in the opposite direction. Fig. 9 is a face view of the ported valve seat and its support. Fig. 10 is a view at right angles to Fig. 9 with portions in section. Fig. 11 is a top plan of the same. Fig. 12 is an enlarged detail in elevation showing the valve considerably exaggerated as to its position with relation to the right hand port. Fig. 13 is a similar view showing the position of the parts with the music sheet and, consequently, the edge guide moved to its extreme right, the position of the valve with relation to the other port being also much exaggerated for the sake of clearness.

Like numerals of reference indicate like parts throughout the several views.

In carrying out the invention the essential features thereof will, of course, be adapted to the style of machine in which they are to be employed. In the present instance, I have shown the application of the present invention to an automatic piano player otherwise of known construction. The parts of such player, aside from those with which the present invention is closely associated, have not been illustrated as the same are believed to be unnecessary. The motor, the re-wind mechanism, the bellows and such other parts as are common to all music players may be all of any of the well-known or approved forms of construction.

Of the parts shown, 1 designates the motor, and 2 and 3 the pneumatics which control the wind and re-wind of the music sheet.

4 is a gate box of well-known construction for controlling the tempo. 5 is the connection between this gate box and the motor. 6 is the governor also of well-known construction connected with the gate box 4 through suitable connection 7.

8 is a connection from the governor 6 to the exhaust mechanism, not shown, but of usual construction and mode of operation.

9 is a portion of the frame supporting the motor and the other parts now to be described.

10 is the music box or frame supporting the music roll, the tracker bar and other parts of which 11 is the music spool supported in any of the well-known or approved ways.

12 is the take-up roll. The left hand end 13 is made adjustable in any suitable manner to compensate for the different widths of music sheet, the other end 14 being fixed with relation to the roll. The take-up roll 12 has its journals 15 mounted in suitable bearings in the frame and upon these journals are mounted the curved arms 16.

17 is a rod disposed parallel with the take-up roll 12. One end of this rod 17 is fastened solidly in the left hand arm and its other end passes through the right hand arm 16 where it is secured by a set screw 18. These two arms are for the purpose of pulling the roller back and forth, to the right or left. The right hand end of this rod is mounted for endwise movement in a suitable bearing in the frame. Upon the outer end of the rod 17 is mounted the support 19 made adjustable thereon in any suitable manner, as by a set screw 20, so as to adjust the edge of the note sheet in relation to the right hand flange of the take-up roll. This support 19 has at its upper end an enlargement 21 provided with chambers 22 and 23 with which connect the flexible tubes 24 and 25 respectively, which tubes connect with the diaphragms which control the valves which control the pneumatics which actuate the tracker bar, as will soon be described. The outer face of this enlarged portion constitutes a valve seat and is provided with elongated ports or openings 26 and 27, in this instance shown as disposed vertically, as seen best in Figs. 9 and 10.

28 is a vertical member pivotally mounted at 29 upon the right hand arm 16 so as to move with the greatest of freedom. The upper end of this member 28 terminates in a lateral member 30 with the upwardly extending portion 31 which serves as the edge guide which is designed to be at all times in contact with the adjacent edge of the music sheet. Extending upwardly from the opposite side of the lateral portion 31 is a lug 32 in which is loosely pivoted at 33 a link 34, the opposite end of which is pivotally connected, as at 35, with the upright arm 36 of a ball crank lever pivoted at its angle, as at 37, to the support 19, the short arm 38 of this bell crank lever carrying a weight 39. This upright portion 36 of the bell crank lever constitutes the valve. It is of a width approximately the same as the distance between the outer boundary lines of the two ports 26 and 27 so that when in its vertical position, both valves are entirely covered thereby. Almost infinitesimal movement of this valve in one direction or the other serves to open one or the other of the ports. In practice the movement of this valve is exceedingly slight, in fact hardly sufficient to be noticeable to the naked eye. Depending from the horizontal arm 38 of the bell crank lever is an arm 40 offset at 41, the lower portion 42 normally being out of contact with the rod 43 of the re-wind mechanism. But, as soon as the re-wind of the music sheet is commenced, the arm 43 contacts with the portion 42 and moves it from its normal vertical position, as shown by dotted lines in Fig. 4, to the full line position in said view. This moves the bell crank lever, the link 34, the weighted arm 38, the upright member 28 and the edge guide 31 from their normal position, that represented by dotted lines, to the position in which they are indicated by full lines in said Fig. 4. This causes the valve to disclose both ports 26 and 27, as indicated by the full line position of these parts in said figure. When in this position with the ports open, the pneumatics 44 and 45 are held in their central position, one opposed to the other. Figs. 5 and 6 illustrate the mechanism for controlling these pneumatics by reason of the connections 24 and 25 with the chambers 22 and 23 controlled by the said ports.

Referring to Fig. 5, 46 is the diaphragm in communication with the tube 24, while 47 is the diaphragm in communication with the tube 25. These diaphragms control the movement of the valves 48 and 49, as seen in Fig. 5 in a well-known way and further detailed description thereof does not seem necessary.

50 is a tube connecting the exhaust chamber 51 with the governor or regulating bellows 6, see Fig. 1.

The pneumatics 44 and 45 are connected rigidly together in any suitable manner, as by the bar 52, so that they move in unison. From this bar projects a pin or the like 53 working in a bifurcation 54 of the lever 55 pivotally mounted at 56 to some fixed support, while pivotally connected with said bar 55, as at 57, is a rod 58, the outer end of which is screw-threaded, as seen at 59, and upon this screw-threaded portion is the bifurcated or split nut 60. Within the bifurcation, or between the two parallel portions of the nut extends a pin 61 depending from the tracker bar 62 so that the tracker bar is compelled to move with said nut. The end of the rod 58 is screw-threaded in the left hand arm 16 of the carriage mechanism. It will be evident that this is but one of the numerous forms of connection between the tracker bar and the nut and any other well-known means may be substituted therefor. I should consider a reversal of such parts a full equivalent, that is two pins depending from the tracker bar and a single nut straddled thereby on the rod. It is to be understood that this tracker bar thus connected is compelled to follow the movement of the take-up roll 12 back and forth. The tracker bar is capable of movement independent of the movement of the take-up roll by adjustment of the nut upon the screw-threaded rod for the purpose of bringing the perforations of the music sheet into proper alinement with the ducts of the tracker bar when the music is first put into the machine. Movement of the tracker bar may be produced in the same manner for transposing, that is for changing from one key to another. The tracker bar is mounted for movement in the direction of its length, being supported in any suitable manner for this purpose. It is guided so as to move at all times perfectly parallel with the take-up roll whether such movement be in unison with the take-up roll or independent thereof as above described for the purposes set forth.

63 is an arm or pointer movable with the carriage, in this instance shown as extending upward from the left hand arm 16, for coöperation with an indicator 64 carried on the tracker bar 62 at the left hand end thereof. This pointer and indicator are for the purpose of indicating when the music sheet is playing in its original key. Adjustment of the nut 60 changes the position of the indicator with relation to the pointer so as to designate the change of key.

As will be understood upon reference to Fig. 1, the take-up roller 12 has its end supports or pins 12ª mounted for free endwise movement in suitable bearings as 12ᵇ secured to the ends of the music box, said pins working through corresponding openings in the said ends of the box so that the take-up roll 12 may move freely back and forth.

With the parts constructed and arranged substantially as hereinbefore set forth, the operation, briefly stated, is as follows. When the music sheet is first applied to the music roll and the free end thereof fastened to the take-up roll in the usual manner and wound a couple of times or so around the take-up roll, or sufficient to bring the first set of perforations in the music sheet over the ducts of the tracker bar, if the perforations of the paper then be found not to be in perfect alinement with the ducts of the tracker bar, the nut 60 is turned so as to move the tracker bar in one direction or the other, so as to bring the holes in the tracker bar in perfect alinement with the perforations of the music sheet. This relative relation of the tracker bar and music sheet remains unchanged regardless of the position of the music sheet on the music roll. My improvement compensates for any change of position of the edge of the music sheet with relation to the spool on which it is wound and from which it is being unwound.

In Fig. 12 I have shown the sheet as in a condition which it often assumes, that is, instead of being wound with its edge parallel with the end or flange of the spool, it is wound at an angle thereto and unevenly. It being understood that the edge guide 31 is at all times in contact with the right hand or "fixed" edge of the music sheet 65, as the music is played and the music sheet unwound from the roll 11, the edge guide being so sensitive in its movement, any lateral movement of the music sheet to the right upon the music spool will move the edge guide to the right, by reason of the pressure of the edge of the music sheet thereon. This pressure of the music sheet upon the edge guide tends to rock the vertical member 28 upon its pivot 29, moving its upper end to the right and this, by reason of the pivotal connection 34 with the valve, gives a slight movement to the latter to the right so as to allow of the ingress of air through the port 26 and this inrushing air passes through the tube 25 to the valve chest of the pneumatics 44 and 45 acting upon the diaphragm 46 and actuating the valves 49 in a well-known way, putting the interior of the bellows 45 into communication with the exhaust and closing it to the atmosphere. This causes the bellows or pneumatic 45 to be deflated sufficiently to cause its movable member to move to the right enough to give to the connecting bar 52 sufficient movement to the right to move the tracker bar sufficiently to compensate for or keep up with the movement of the music sheet. The take-up roll being movable with the tracker bar, of course, follows it in this movement. It is to be understood that the movement of the tracker and, consequently, of the valve 36 is, as a rule, almost infinitesimal and is hardly perceptible to the eye. The mechanism is necessarily very sensitive in its movement and it is essential that the valve 36 should open but slightly. To insure this, I make the bleed holes 66 exceedingly small, as seen in Fig. 5, so that as soon as the music sheet is moved either way, the small inrush of air through either port 26 or 27, according to the movement of the sheet, rushes through its corresponding tube 24 or 25 leading to the diaphragms 47 or 46, causing immediate action of the diaphragms 46 or 47, operating the valves 48 or 49 in the well-known manner and closing the pneumatic 45 or 44 to the atmosphere and putting the same in communication with the exhaust, thereby causing the movement of the lever 55 in either direction, according to the movement of the sheet, thereby moving the carriage and tracker bar and the valve seat 21 and closing the port 26 or 27; the bleeds cause the diaphragms and all the mechanism mentioned to return to their normal positions. Bringing the valve seat back to this position closes both ports 26 and 27 and the bleeds allow the return of the valve 48 or 49, leaving the mechanism in this position until further affected by the sheet in this manner. It is to be understood that the music sheet moves laterally no one time any great distance but that there may be numerous movements at intervals during the unwinding of the sheet from the music roll. During the steady movement of the sheet without any lateral displacement, the tracker bar and carriage stay immovable. When the music sheet moves laterally to the left, the edge guide 31 follows the same, being kept constantly in contact therewith by reason of the weight 39, the natural tendency of which is always to keep the edge guide to the left. This lateral movement of the music sheet to the left causes the valve 36 to move sufficiently to allow air to pass in the port 27, which, passing through the tube 24, actuates the diaphragm 47 and the valves 48 to put the pneumatic 44 in communication with the exhaust and close it to the atmosphere. When this occurs, the member 55 is moved so as to move the rod 58 and, consequently, the tracker bar and the carriage to the left, so as to keep the holes of the tracker bar directly in register with the perforations of the music sheet.

Fig. 7 indicates the condition of the pneumatics and the position of the member 55 when the tracker bar has been moved to the left to the full extent permissible by the condition of the music sheet in Fig. 12, while Fig. 8 shows the condition of the same parts when the tracker bar is moved to the right so far as permitted by the condition of the music sheet, as shown in Fig. 13. It will be understood that under conditions of less movement of the tracker bar, the parts seen in Figs. 7 and 8 will assume positions intermediate those therein illustrated.

Fig. 4 shows the position of the parts ready for re-winding. Under these conditions, the member 28 and valve member 36 are moved to the right sufficiently to entirely disclose the ports 26 and 27. Under these conditions, the pneumatics 44 and 45 are held in their central position as the condition of both is the same, both being put in communication with the exhaust and closed to the atmosphere. The parts seen in Fig. 4 are thrown into such position by reason of the engagement of the end of the rod 43 with the depending member 42 as the rewind mechanism is thrown into play. This movement of the rod 43 to the left is caused by the inflation of the pneumatic 2 as the pneumatic 3 is deflated, 67 being the clutch actuating rod carried by said pneumatic 2. As this wind and re-wind mechanism is old and well-known in the art, it is not thought necessary to show it in detail or any of its connections.

The method herein disclosed is not claimed in this application as it forms the basis of a separate application, filed as a division hereof, June 27, 1910, Serial No. 569,037.

What is claimed as new is:—

1. The combination with a take-up spool for a note sheet and a tracker bar adjustable independently thereof, automatic means for simultaneously moving the tracker bar and take-up spool transversely in relation to the travel of the note sheet.

2. A take-up spool for a note sheet, a tracker bar mounted for movement in unison therewith, and means including means movable with the tracker bar for simultaneously moving said tracker bar and take-up spool in the direction of their length.

3. A tracker bar and a take-up roll for a note sheet mounted for movement in unison therewith, and automatic means including means movable with the tracker bar controlled by the lateral movement of the note sheet for simultaneously moving the tracker bar and take-up roll transversely in relation to the travel of the note sheet.

4. A tracker bar and a take-up roll for a note sheet and automatic means including means movable with the tracker bar for moving the latter and the take-up roll simultaneously in the same direction.

5. A tracker bar and a take-up roll mounted for movement in unison, and means including means movable with the tracker bar for automatically moving the same and the take-up roll.

6. A tracker bar, a take-up roll mounted for movement in unison therewith, and means for adjusting the tracker bar independently of the take-up roll.

7. An automatically controlled carriage, a tracker movable therewith and transposing means on the carriage connected with the tracker for movement independent of the carriage to thereby effect an independent movement of the tracker bar.

8. A tracker and a take-up roll mounted for movement in unison or independently of each other, and automatic means for simultaneously moving said tracker and take-up roll transversely in relation to the travel of a note sheet.

9. A tracker bar and a take-up roll for a note sheet mounted for movement in unison and movable means mounted for simultaneous movement with the tracker bar and having constant contact with the edge of the note sheet and following the same in its transverse movements in both directions.

10. A tracker bar and a take-up roll for a note sheet mounted for movement in unison, an edge guide in constant contact with one edge of the note sheet, and means movable with the tracker bar controlled by said edge guide for automatically giving movement to said tracker bar and take-up roll.

11. A tracker bar, a take-up roll for the music sheet mounted for movement in unison therewith, an edge guide for constant contact with one edge of a note sheet, a valve seat with a plurality of ports, a valve for said ports operated by said edge guide for causing the tracker bar to travel to the right or left and following the note sheet in movement in either lateral direction.

12. A movably mounted tracker bar and a take-up roll for a note sheet mounted for movement in unison, a pneumatically controlled tracker bar operating mechanism controlled by means movable with the tracker bar and an edge guide for constant contact with an edge of the sheet operatively connected with the pneumatic means to control the same to control said pneumatic means in both lateral directions of the sheet.

13. A tracker bar mounted for endwise movement, means for moving the same, a take-up roll for the music sheet mounted for movement in unison with said tracker bar, pneumatic means controlled by means movable with the tracker bar for moving the tracker bar and movably mounted means for constant contact with an edge of the note sheet operatively connected with the pneumatic means to control the same for controlling the movements of the tracker bar in both directions from one edge of the sheet.

14. A movably mounted tracker bar, means for moving the same, a take-up roll for the music sheet mounted for movement in unison with said tracker bar, pneumatic means connected to and controlled by means movable with the tracker bar for moving it in opposite directions, and a movably mounted edge guide adapted for constant contact with one edge only of a note sheet operatively connected with the pneumatic means to control the same for controlling said pneumatic means for actuating the same to move the tracker bar in both directions.

15. A movably mounted tracker bar, a take-up roll for the music sheet mounted for movement in unison with said tracker bar, pneumatic means for moving the same in both directions, said pneumatic means being controlled by means movable with the tracker bar, and a pivotally mounted edge guide for constant contact with one edge only of a note sheet and constructed to control said pneumatic means for lateral movement of the sheet in either direction.

16. A movably mounted tracker bar, a take-up roll for the music sheet mounted for movement in unison with said tracker bar, means for moving the same for alinement with a note sheet and independent means for moving the same for transposing.

17. A movably mounted tracker bar, means for moving the same for alinement with a note sheet, independent means for moving the same for transposing, and a take-up roll movable with the tracker bar.

18. A movably mounted tracker bar, means for moving the same for alinement with a note sheet, independent means for moving the same for transposing, a take-up roll movable with the tracker bar, and means whereby the tracker bar may be adjusted independently of the note sheet.

19. A tracker bar, a take-up roll movable in unison therewith, means for moving the tracker bar independently of the take-up roll, and means for adjusting the tracker bar and take-up roll simultaneously.

20. A movable tracker bar, pneumatic means for moving the tracker bar, adjustable controlling means therefor, and an edge guide mounted independently of and pivotally connected with said controlling means.

21. A movable tracker bar, pneumatic means for operating the tracker bar and adjustable controlling means for the tracker bar movable for adjusting the tracker bar with relation to a note sheet.

22. A movably mounted tracker bar, a take-up roll for the music sheet mounted for movement in unison with said tracker bar, pneumatic means controlled by means movable with the tracker bar for controlling the same, and a single valve for controlling said tracker bar in both movements of a sheet.

23. A movably mounted tracker bar, pneumatic means controlled by means movable with the tracker bar for actuating the same, an edge guide for constant contact with one edge only of a sheet, and means movable thereby for controlling said pneumatic means.

24. A movably mounted tracker bar, a take-up roll for a note sheet mounted for movement in unison with said tracker bar, pneumatic actuating means therefor operatively connected with and controlled by means movable with the tracker bar, and means for controlling the movement of said pneumatic actuating means from the fixed edge of a note sheet in both the back and forth lateral movement thereof.

25. A movably mounted tracker bar, a take-up roll for a note sheet mounted for movement in unison with said tracker bar, a plurality of pneumatics for moving said tracker bar and movable means in contact with and controlled from one edge of a sheet for automatically controlling said pneumatics.

26. A movably mounted tracker bar, a take-up roll for a note sheet mounted for movement in unison with said tracker bar, pneumatic means for actuating the same, and a slide valve for controlling said pneumatics for actuation of the bar in either direction of its endwise movement.

27. A movably mounted tracker bar, a take-up roll for a note sheet mounted for movement in unison with said tracker bar, pneumatic means for actuating the same, a slide valve for controlling said pneumatics for actuation of the bar in either direction of its endwise movement, and an edge guide controlling said valve in both directions.

28. A movably mounted tracker bar, a take-up roll for a note sheet mounted for movement in unison with said tracker bar, pneumatic means for actuating the same in both directions of its endwise movement, a pivotally mounted slide valve for controlling the pneumatics, and an edge guide movably connected with said valve and movable in contact with an edge of a sheet in its lateral movements in both directions.

29. A movably mounted carriage, and a movably mounted tracker bar mounted to move with or independently of said carriage, a take-up roll for the note sheet mounted for movement in unison with the tracker bar, and interengaging means between said carriage and tracker.

30. A movably mounted tracker bar, a pivotally mounted edge guide adapted to contact with the edge of a traveling sheet, and means movably connected therewith for throwing the edge guide out of operative position by movement of the re-wind mechanism, said edge guide being operatively connected with the tracker bar.

31. A movably mounted tracker bar, pneumatic means for actuating the same, a pivotally mounted edge guide adapted to contact with the edge of a traveling sheet, and means whereby the same is thrown out of operative position by the throwing in of the re-wind mechanism, said edge guide being operatively connected with the tracker bar.

32. A movably mounted tracker bar and take-up spool mounted to move in unison, an edge guide for controlling the movements of said tracker bar and take-up spool, and means for locking said tracker bar and take-up spool when re-winding the music sheet.

33. A movably mounted tracker bar, pneumatic means connected with the tracker for actuating the same, an edge guide adapted to contact with the edge of a traveling note sheet and operatively connected with said pneumatic means, and means coöperating with said edge guide for locking said bar against movement through said pneumatic means during re-winding.

34. A movably mounted tracker bar, pneumatic means controlled by means movable with the tracker bar for moving the same, an edge guide mounted to contact with one edge only of a traveling note sheet and operatively connected with said pneumatic means, and means for throwing said guide out of operative position and locking the tracker bar against movement upon the throwing in of the re-wind mechanism.

35. A take-up spool mounted to move in the direction of its length, a slidingly mounted tracker bar, means for moving the tracker bar in both directions by the transverse movement of a note sheet, and connections between the tracker bar and take-up spool whereby the tracker bar may be adjusted independently of the take-up spool.

36. A movably mounted tracker bar, a movably mounted take-up spool and connections between the same and controlled by means including means movable with the tracker bar to move said tracker bar and take-up spool in unison.

37. A movably mounted tracker bar, a movably mounted take-up spool, and connections between the same whereby they move in unison, said means serving also for adjustment of the tracker bar independent of the take-up spool.

38. A movably mounted tracker bar, a movably mounted take-up spool, and connections between the same whereby they move in unison, said means serving also for adjustment of the tracker bar independent of the take-up spool and further for the purpose of transposing.

39. A movably mounted tracker bar, a carriage endwise movable therewith, and an edge guide mounted on the carriage and adapted to contact with the edge of a traveling note sheet, and pneumatic means operatively connected with said edge guide and tracker bar.

40. A movably mounted tracker bar, a carriage endwise movable therewith, and an edge guide pivotally mounted on the carriage and adapted to contact with the edge of a traveling note sheet, and pneumatic means operatively connected with said edge guide and tracker bar.

41. A movably mounted take-up roll, a carriage therefor, a movably mounted tracker bar, an edge guide adapted to contact with the edge of a traveling note sheet, means whereby said edge guide and carriage move in unison, and mechanism intermediate said edge guide and tracker-bar, operatively connected with the latter.

42. A movably mounted tracker bar, a movably mounted take-up roll, a carriage for moving said take-up roll, and an edge guide on the carriage independent of the tracker bar and adapted to contact with the edge of a traveling note sheet.

43. A movably mounted tracker bar, a movably mounted carriage, a take-up roll carried thereby, an edge guide pivotally mounted on the carriage independent of the tracker bar and adapted to contact with the edge of a traveling note sheet, and pneumatic means connected with the tracker bar and controlled by the movement of said edge guide.

44. A movably mounted tracker bar, a movably mounted carriage, a take-up roll carried thereby, an edge guide pivotally mounted on the carriage independent of the tracker bar and adapted to contact with the edge of a traveling note sheet, pneumatic means connected with the tracker bar and controlled by the movement of said edge guide, and means for moving the tracker bar independently of the take-up roll.

45. A movably mounted tracker bar, a movably mounted carriage, a take-up roll carried thereby, an edge guide pivotally mounted on the carriage independent of the tracker bar and adapted to contact with the edge of a traveling note sheet, pneumatic means connected with the tracker bar and controlled by the movement of said edge guide, and means for moving the take-up roll with relation to the edge of the note sheet.

46. A movably mounted tracker bar, a movably mounted carriage, a take-up roll carried thereby, an edge guide pivotally mounted on the carriage independent of the tracker bar and adapted to contact with the edge of a traveling note sheet, pneumatic means controlled by the movement of said edge guide, means for moving the tracker bar independently of the take-up roll, and means for moving the take-up roll with relation to the edge of a note sheet.

47. A movably mounted carriage, a take-up roll movable therewith, a movably mounted tracker bar, connections between the take-up roll and tracker bar, an edge guide independent of the tracker bar and adapted to contact with the edge of a traveling note sheet, and pneumatic means for actuating the tracker bar controlled by the movement of the edge guide.

48. A movably mounted take-up roll, a tracker bar mounted for movement independent thereof, connections between the take-up roll and tracker bar, an edge guide movable independently of the tracker bar and adapted to contact with the edge of a traveling note sheet, and means for moving the tracker bar and take-up roll in unison.

49. A movably mounted carriage, a take-up roll carried thereby, a movably mounted tracker bar, connections between the take-up roll and tracker bar, and a counterweighted edge guide connected with the tracker bar and carried by said carriage for constant contact with the edge of a note sheet and following its lateral movements in both directions.

50. A movably mounted tracker bar, a take-up roll mounted for movement in unison with said tracker bar, pneumatic means for controlling the same, and throttle mechanism for said pneumatics, and an edge guide operatively connected with and controlling said throttle mechanism.

51. A movably mounted carriage, a take-up roll movable therewith, a movably mounted tracker bar, an edge guide independent of the tracker bar and adapted to contact with an edge of a traveling note sheet, pneumatic means for actuating the tracker bar controlled by the movement of the edge guide, and throttle mechanism for controlling said pneumatics.

52. A movably mounted tracker bar, a movably mounted carriage, a take-up roll carried thereby, an edge guide pivotally mounted on the carriage independent of the tracker bar and adapted to contact with an edge of a traveling note sheet, pneumatic means connected with the tracker bar and controlled by the movement of said edge guide, and forming throttle mechanism for said pneumatics.

53. A movably mounted tracker bar, a movably mounted carriage, a take-up roll carried thereby, an edge guide pivotally mounted on the carriage independent of the tracker bar and adapted to contact with an edge of a traveling note sheet, pneumatic means connected with the tracker bar and controlled by the movement of said edge guide, means for moving the tracker bar independently of the take-up roll, and forming throttle mechanism for said pneumatics.

54. A movably mounted tracker bar, a movably mounted carriage, a take-up roll carried thereby, an edge guide pivotally mounted on the carriage independent of the tracker bar and adapted to contact with an edge of a traveling note sheet, pneumatic means connected with the tracker bar and controlled by the movement of said edge guide, means for moving the take-up roll with relation to the edge of the note sheet, and forming throttle mechanism for said pneumatics.

55. A movably mounted tracker bar, a movably mounted carriage, a take-up roll carried thereby, an edge guide pivotally mounted on the carriage independent of the tracker bar, pneumatic means connected with the tracker bar and controlled by the movement of said edge guide, means for moving the tracker bar independently of the take-up roll, means for moving the take-up roll with relation to the edge of the note sheet, and forming throttle mechanism for said pneumatics.

56. The combination with a movable tracker bar, a carriage and a take-up roll mounted for movement in unison therewith and adjustable with relation to the tracker bar, of an indicator movable with the carriage for indicating the relative positions of the tracker bar and take-up roll.

57. The combination with a take-up roll and a tracker bar mounted for independent or simultaneous movement transversely to the line of travel of a music sheet, and an edge guide connected with the tracker bar and adapted for constant contact with one edge only of a note sheet, of means movable with the take-up roll and coöperating means on the tracker bar for indicating the relative positions of the take-up roll and tracker bar.

58. In a device of the character described, a tracker bar, a take-up roll mounted for movement in unison therewith, an edge guide adapted to contact with one edge only of a traveling note sheet and interposed between the music roll and the tracker bar and controllable by means movable with the tracker bar.

59. In a device of the character described, a slidably mounted tracker bar, a take-up roll mounted for movement in unison with the tracker bar, and automatic means for actuating the same embodying an edge guide for contact with the edge of a music sheet between the music roll and the tracker bar.

60. In a device of the character described, a slidably mounted tracker bar, pneumatic means for actuating the same, and a movably mounted edge guide for contact with the edge of a music sheet prior to its passage over the tracker bar, a take-up roll movable simultaneously with the tracker bar transversely in relation to the travel of the note sheet, said edge guide being operatively connected with the tracker bar.

Signed by me at Washington, D. C., this 9th day of March 1910.

GEORGE P. BRAND.

Witnesses:
E. H. BOND,
JOHN SCRIVENER.

Copies of this patent may be obtained for five cents each, by addressing the "Commissioner of Patents, Washington, D. C."